(12) United States Patent
Christensen et al.

(10) Patent No.: US 6,974,107 B2
(45) Date of Patent: Dec. 13, 2005

(54) THRUST REVERSER SYSTEM ACTUATOR HAVING AN INTEGRAL TORQUE LIMITER

(75) Inventors: Donald J. Christensen, Phoenix, AZ (US); Casey Hanlon, Queen Creek, AZ (US); Douglas T. Hopper, Chandler, AZ (US); Andrew Johnson, Scottsdale, AZ (US); Robert D. Kortum, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/465,413

(22) Filed: Jun. 18, 2003

(65) Prior Publication Data

US 2005/0040284 A1 Feb. 24, 2005

(51) Int. Cl.[7] .............................................. F16H 57/02
(52) U.S. Cl. ......................... 244/101; 74/650; 173/178
(58) Field of Search ............................. 244/101, 102 R, 244/102 A, 102 SS, 53 R, 54, 56, 57, 58, 53 B; 74/650; 173/178

(56) References Cited

U.S. PATENT DOCUMENTS

| | | |
|---|---|---|
| 1,199,612 A | 9/1916 | Rice |
| 2,015,688 A | 10/1935 | Ney |
| 2,157,574 A * | 5/1939 | Wiesel ........................ 464/35 |
| RE22,852 E | 3/1947 | Swift, Jr. |
| 2,441,052 A | 5/1948 | Wilmer |
| 2,660,281 A | 11/1953 | Ochtman |
| 2,701,478 A * | 2/1955 | Hanley ....................... 74/89.38 |
| 2,819,589 A | 1/1958 | Geyer |
| 3,082,684 A | 3/1963 | Sturla |
| 3,367,456 A | 2/1968 | Bohnhoff |
| 3,596,740 A | 8/1971 | Nau |
| 3,653,226 A | 4/1972 | Westbury |
| 3,704,765 A * | 12/1972 | Withrow et al. ............ 188/134 |
| 3,831,400 A | 8/1974 | Morin |
| 4,030,578 A | 6/1977 | Cacciola et al. |
| 4,196,799 A | 4/1980 | Taylor et al. |
| 4,273,006 A | 6/1981 | Woodbury |
| 4,273,388 A | 6/1981 | Muller |
| 4,318,304 A | 3/1982 | Lang |
| 4,318,604 A * | 3/1982 | Kobori ........................ 396/535 |
| 4,346,793 A | 8/1982 | Fuse et al. |
| 4,442,928 A | 4/1984 | Eastman |
| 4,458,582 A | 7/1984 | Linton |
| 4,459,121 A | 7/1984 | Gazzera et al. |
| 4,459,867 A * | 7/1984 | Jones ........................ 74/89.38 |
| 4,531,617 A | 7/1985 | Martin et al. |
| 4,543,783 A | 10/1985 | Greiine et al. |
| 4,545,470 A | 10/1985 | Grimm |
| 4,556,131 A | 12/1985 | Chapman |
| 4,579,039 A | 4/1986 | Ebbing |

(Continued)

OTHER PUBLICATIONS

"Slip Clutch"; www.rec.ri.cmu.edu/education/multimedia/slip.shtml; p. 1.*
"Mechanical Torque limiters still make sense"; Machine design, www.machinedesign.com.*

*Primary Examiner*—Teri P. Luu
*Assistant Examiner*—Stephen Holzen
(74) *Attorney, Agent, or Firm*—Ingrassia Fisher & Lorenz

(57) ABSTRACT

A thrust reverser system actuator assembly is provided that includes a torque limiter to limit the number of torque that may be applied to the actuator assembly. The actuator assembly includes an actuator and a torque limiter assembly. The actuator is adapted to receive a drive force and is configured, in response to receipt of the drive force, to move between a stowed position and a deployed position. The torque limiter assembly is coupled to an end of the actuator and is configured to limit torque applied to the actuator assembly upon a torque magnitude being reached in at least the actuator.

24 Claims, 5 Drawing Sheets

U.S. PATENT DOCUMENTS

| | | |
|---|---|---|
| 4,625,843 A | 12/1986 | Maltby et al. |
| 4,693,349 A | 9/1987 | Tysver |
| 4,736,807 A | 4/1988 | Davis |
| 4,871,296 A | 10/1989 | Laessle et al. |
| 4,898,265 A | 2/1990 | Metcalf |
| 4,905,805 A | 3/1990 | Grimm |
| 4,944,379 A | 7/1990 | Hasser |
| 5,046,376 A | 9/1991 | Baker |
| 5,145,041 A | 9/1992 | Hirai |
| 5,280,704 A | 1/1994 | Anderson et al. |
| 5,359,848 A | 11/1994 | Davies |
| 5,545,109 A | 8/1996 | Hayakawa |
| 5,609,020 A | 3/1997 | Jackson et al. |
| 5,616,080 A * | 4/1997 | Miescher .................... 464/35 |
| 5,630,490 A | 5/1997 | Hudson et al. |
| 5,655,636 A * | 8/1997 | Lang et al. ................. 192/223 |
| RE35,617 E * | 9/1997 | Krivec ....................... 173/178 |
| 5,743,490 A * | 4/1998 | Gillingham et al. ...... 244/75 R |
| 5,769,362 A | 6/1998 | Greene et al. |
| 5,811,139 A | 9/1998 | Hehl |
| 5,901,817 A | 5/1999 | Gitnes |
| 5,944,148 A | 8/1999 | Bae et al. |
| 5,950,774 A | 9/1999 | Lang et al. |
| 5,957,798 A | 9/1999 | Smith, III et al. |
| 6,044,943 A | 4/2000 | Bytzek et al. |
| 6,059,085 A | 5/2000 | Farnsworth |
| 6,086,282 A * | 7/2000 | Dutt et al. .................... 403/41 |
| 6,202,803 B1 | 3/2001 | Lang |
| 6,209,690 B1 | 4/2001 | Kuivamaki et al. |
| 6,240,797 B1 | 6/2001 | Morishima et al. |
| 6,332,842 B1 | 12/2001 | Tabuchi et al. |
| 6,358,152 B2 | 3/2002 | Casutt |
| 6,401,557 B1 | 6/2002 | Davies |
| 6,487,846 B1 | 12/2002 | Chakkera et al. |
| 6,494,033 B1 | 12/2002 | Davies |
| 6,564,541 B2 * | 5/2003 | Ahrendt ....................... 60/204 |
| 2002/0134180 A1 * | 9/2002 | Gorin et al. ................ 74/89.37 |
| 2003/0006119 A1 * | 1/2003 | Harvey ....................... 192/141 |
| 2003/0070416 A1 * | 4/2003 | Johnson et al. ............ 60/226.2 |

\* cited by examiner

THRUST REVERSER SYSTEM ACTUATOR HAVING AN INTEGRAL TORQUE LIMITER

FIELD OF THE INVENTION

The present invention relates to aircraft engine thrust reverser actuation systems and, more particularly, to a thrust reverser system actuator that includes an integral torque limiter assembly to limit the torque applied to the actuator.

BACKGROUND OF THE INVENTION

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into the three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reverses are normally used on high-bypass ratio jet engines. This type of thrust reverser is located on the circumference of the engine's midsection and, when deployed, exposes and redirects air flow through a plurality of cascade veins. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. In the stowed position, the thrust reversers do not redirect the jet engine's thrust.

The moveable thrust reverser components in each of the above-described designs are moved between the stowed and deployed positions by actuators. Power to drive the actuators may come from a dual output power drive unit (PDU), which may be electrically, hydraulically, or pneumatically operated, depending on the system design. A drive unit train that includes one or more drive mechanisms, such as flexible rotating shafts may interconnect the actuators and the PDU to transmit the PDU's drive force to the moveable thrust reverser components.

Each of the above-described thrust reverser system configuration is robustly designed and is safe and reliable. Nonetheless, analysis has shown that secondary damage to various portions of the thrust reverser system may result under certain postulated circumstances. For example, if one of the actuators coupled to one of the PDU outputs becomes jammed, it is postulated that all of the drive force supplied from the PDU could be concentrated, via the synchronization mechanisms, on the jammed actuator. This postulated condition may result in damage to the actuator system components, including the PDU, actuators, drive mechanisms, or to the movable thrust reverser components. Repairing such damage can be costly and result in aircraft down time. One solution is to use stronger components, but this increases the cost and/or weight of the thrust reverser system. Another solution is to include numerous, independently operated torque limiters or decoupler assemblies in each drive train coupled to the PDU outputs. However, this solution may also increase system cost and/or weight.

Accordingly, there is a need for a thrust reverser system that improves upon one or more of the drawbacks identified above. Namely, a system that reduces the likelihood of component damage if the thrust reverser system fails, for example, by a jammed actuator, without significantly increasing the cost and/or the weight of the thrust reverser system components. The present invention addresses one or more of these needs.

SUMMARY OF THE INVENTION

The present invention provides a thrust reverser system actuator assembly that includes a torque limiter to limit the amount of torque that may be applied to the actuator assembly.

In one embodiment, and by way of example only, a thrust reverser control system includes a power drive unit, at least two drive mechanisms, and at least two actuator assemblies. The power drive unit is operable to supply a drive force, and each drive mechanism coupled to receive the drive force from the power drive unit. Each actuator assembly is coupled to at least one of the drive mechanisms and includes an actuator and a torque limiter assembly. The actuator is coupled to receive the drive force from one of the drive mechanisms, the actuator has at least one end that rotates in response to the drive force, and is configured to move, upon receipt of the drive force, between a stowed position and a deployed position. The torque limiter assembly is mounted to the end of the actuator and is configured to limit torque applied to the actuator assembly upon a torque magnitude being reached in at least the actuator In another exemplary embodiment, an actuator assembly includes an actuator and a torque limiter assembly. The actuator is adapted to receive a drive force, the actuator has at least one end that rotates in response to the drive force and is configured, in response to receipt of the drive force, to move between a stowed position and a deployed position. The torque limiter assembly is mounted to the end of the actuator and is configured to limit torque applied to the actuator assembly upon a torque magnitude being reached in at least the actuator.

In yet another exemplary embodiment, a torque limiter assembly that is configured to limit torque transmission between a thrust reverser actuator and a rod end assembly includes at least two roller pins and at least two substantially resilient cantilever arms. Each roller pin has an outer surface and is moveably mounted in a groove formed in the rod end assembly. Each cantilever arm has a fixed end and a free end. Each cantilever arm fixed end is fixedly coupled to the actuator and each cantilever arm free end is in contact with the outer surface of one of the roller pins, to thereby apply a radical load thereon.

In yet still another exemplary embodiment, a rod end assembly for coupling to a thrust reverser moveable component includes a main body, two or more pin grooves, and a bearing groove. The main body has an outer peripheral surface, and the pin grooves are formed in, and are evenly spaced around, the main body outer peripheral surface. The bearing groove is formed in, and circumscribes, the main body outer peripheral surface, and is adapted to receive a plurality of ball bearings therein.

In still a further exemplary embodiment, a method of limiting torque in an actuator assembly that has at least an actuator adapted to translate includes sensing a torque magnitude applied to at least the actuator. When at least a predetermined torque magnitude is reached in the actuator, torque applied to the actuator assembly is limited.

Other independent features and advantages of the preferred thrust reverser system and actuator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
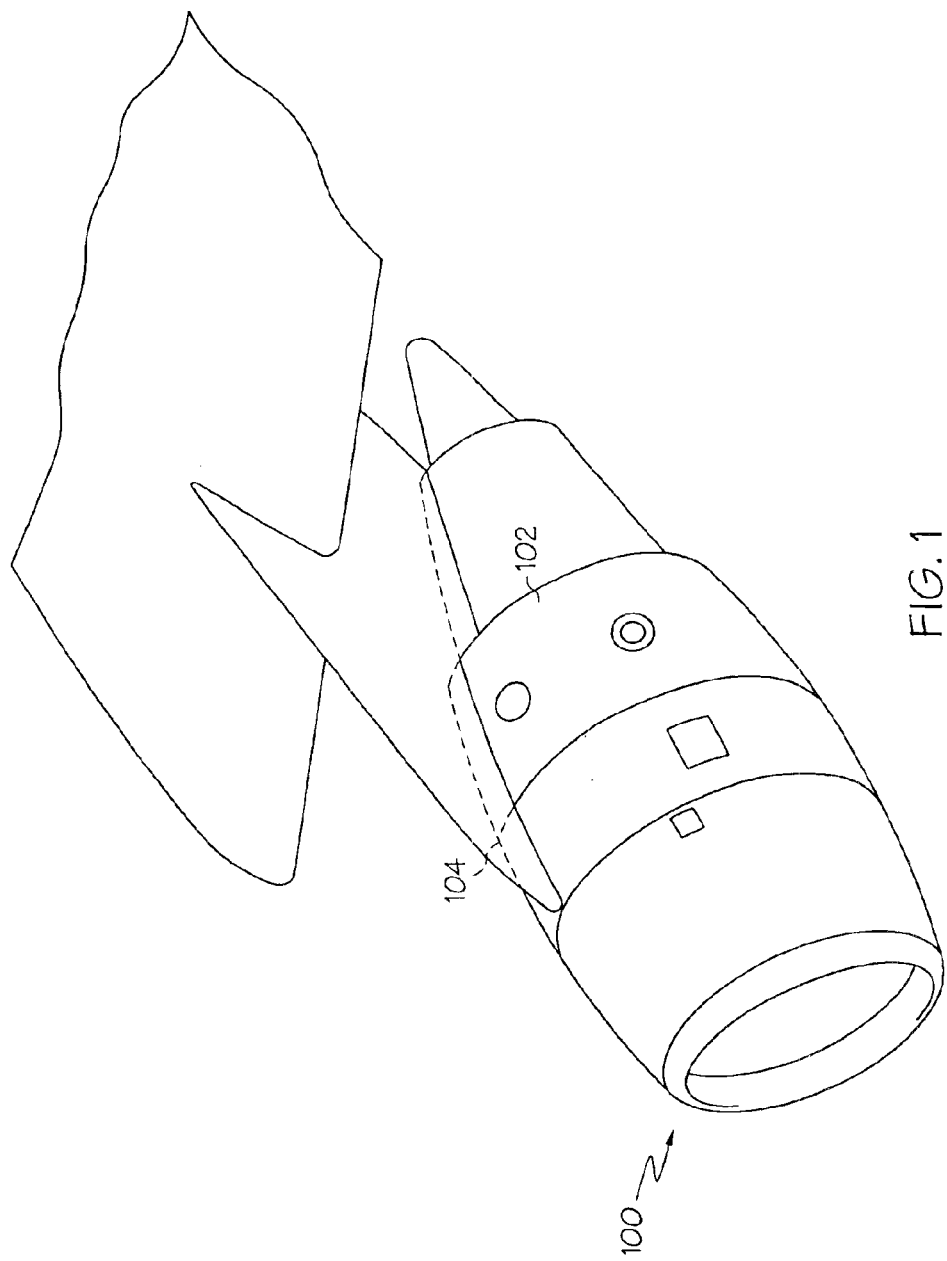
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vans. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
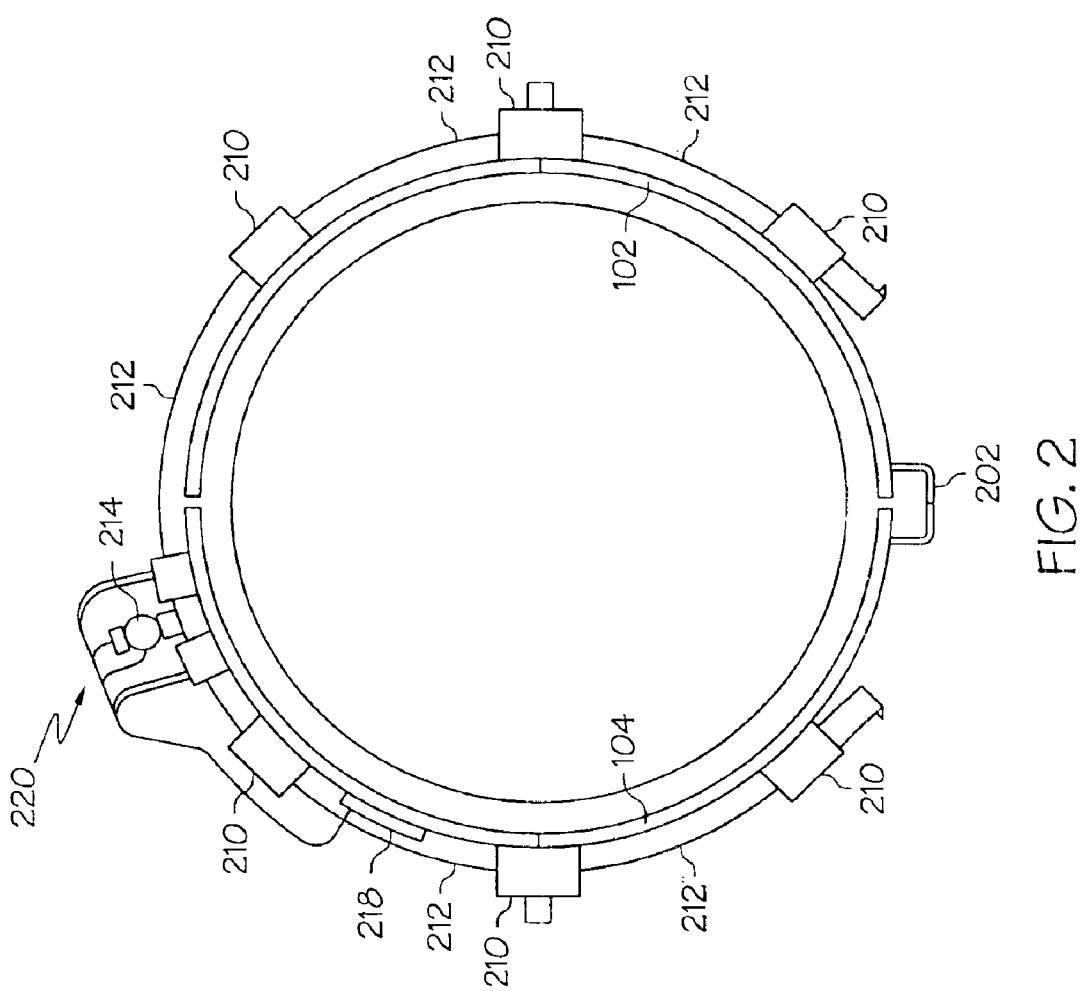
FIG. 2 is a simplified end view of a thrust reverser actuation system according to an exemplary embodiment of the present invention.

As shown more clearly in FIG. 2, a plurality of actuator assemblies 210 are individually coupled to the transcowls 102 and 104. In the depicted embodiment, half of the actuator assemblies 210 are coupled to one of the transcowls 102, and the other half are coupled to another transcowl 104. While not critical to understand or enable the present invention, it is noted that some or all of the actuator assemblies 210 may include locks, some or all of which may include position sensors. In addition, the transcowls 102 and 104 may also, or alternatively, each include locks. It is noted that the actuator assembly 210 may be any one of numerous actuator designs presently known in the art or hereafter designed. However, in this embodiment the actuator assemblies 210 are ballscrew actuators. It is additionally noted that the number and arrangement of the actuator assemblies 210 is not limited to what is depicted in FIG. 2, but could include other numbers of actuator assemblies 210 as well. The number and arrangement of actuators is selected to meet the specific design requirements of the system.

The actuator assemblies 210 are interconnected via a plurality of drive mechanisms 212, each of which, in the particular depicted embodiment, is a flexible shaft. Using the flexible shafts 212 in this configuration preferably ensures that the actuator assemblies 210 and the transcowls 102 and 104 move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuator assemblies 210.

A power drive unit (PDU) assembly 220, which may include a torque decoupler assembly 216, is coupled to the actuator assemblies 210 via one or more flexible shafts 212. In the depicted embodiment, the PDU assembly 220 includes a motor 214 that is coupled to the torque decoupler assembly 216. The motor 214 may be any one of numerous types of motors such as, for example, an electric (including any one of the various DC or AC motor designs known in the art), a hydraulic, or a pneumatic motor. The torque decoupler assembly 216 is coupled between an output of the motor 214 and two of the flexible shafts 212. Moreover, though not explicitly depicted in FIG. 2, the PDU assembly 220 may include a lock mechanism. In any case, with the depicted arrangement, the rotation of the PDU assembly 220 results in the synchronous operation of the actuator assemblies 210, via the flexible shafts 212, thereby causing the transcowls 102 and 104 to move at substantially the same rate.

The PDU assembly 220 is controlled by a control circuit 218. The control circuit 218 receives commands from a non-illustrated engine control system such as, for example, a FADEC (full authority digital engine control) system, and provides appropriate activation signals to the PDU assembly 220 in response to the received commands. In turn, the PDU assembly 220 supplies a drive force to the actuator assemblies 210 via the flexible shafts 212. As a result, the actuator assemblies 210 cause the transcowls 102 and 104 to translate between the stowed and deployed positions.

Figure 3:
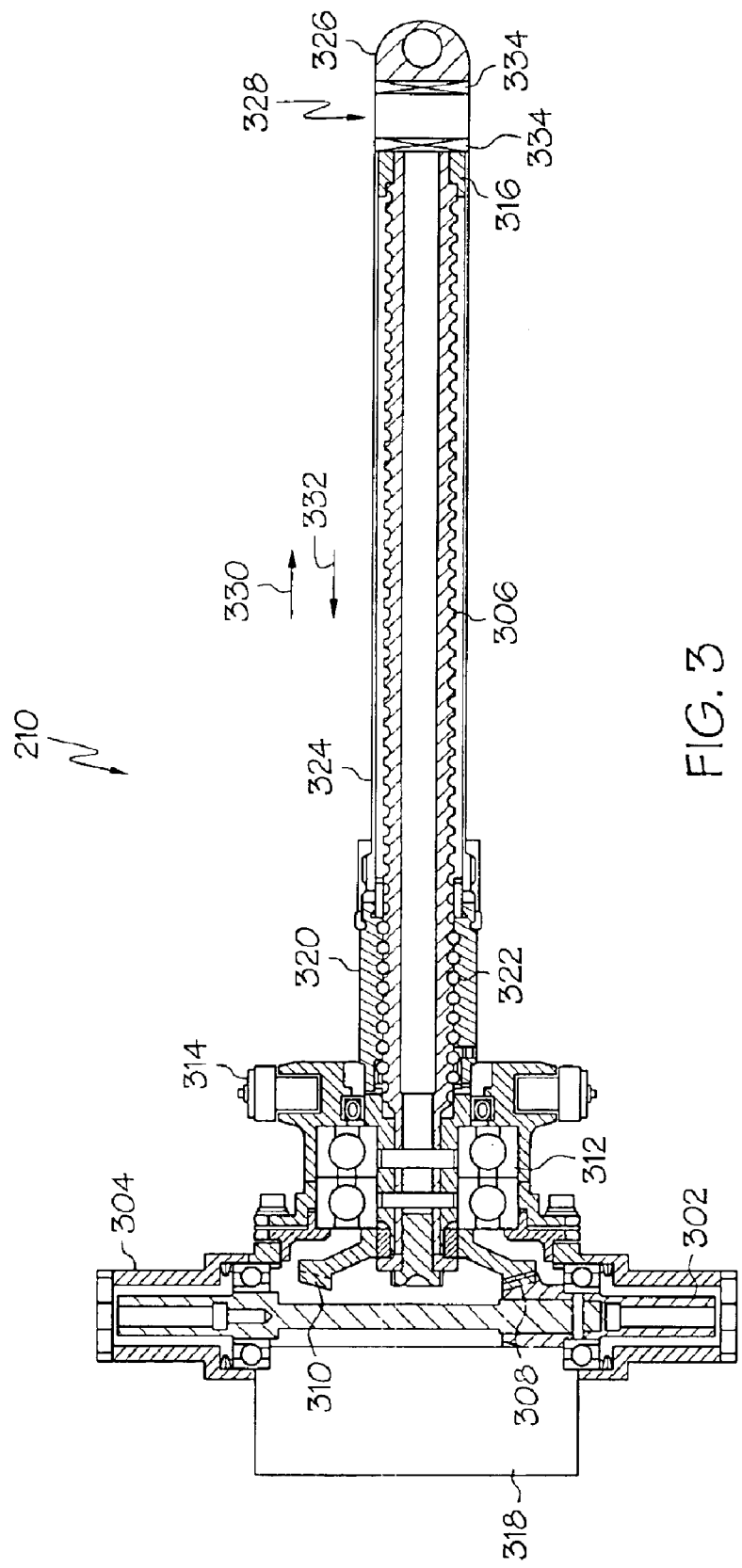
FIGS. 3 and 4 are cross section views of alternative embodiments of an actuator assembly that may be used in the thrust reverser actuation system of FIG. 2.

The actuator assemblies 210 used in the thrust reverser system 200 may be any one of numerous actuator designs presently known in the art or hereafter designed. However, in the depicted embodiment the actuator assemblies 210 are ballscrew type actuators. An exemplary embodiment of this type of actuator 210 is shown in FIG. 3, and will now be discussed. In the depicted embodiment, the actuator 210 includes a drive shaft 302, which is mounted in an actuator housing 304, and a ball screw shaft 306 that extends through the actuator assembly housing 304. The drive shaft 302 is adapted to couple to one of the flexible shafts 212 (not shown in FIG. 3), and includes a first bevel gear 308 that mates with a second bevel gear 310. The second bevel gear 310 is coupled to the ball screw shaft 306, which is rotationally supported by a duplex bearing assembly 312. One end of the ball screw shaft 306 is connected, via a gimbal mount 314, to the forward end of the engine nacelle support (not illustrated). Another end of the ball screw shaft 306 is rotationally supported by, for example, a bearing assembly 316. The depicted actuator assembly 210 also includes a lock assembly 318, which is coupled to the actuator housing 304.

A ball nut 320 is rotationally supported on the ball screw shaft 306 by a plurality of ball bearings 322. An extension tube 324 is coupled at one end to the ball nut 320, or is formed integrally with the ball nut 320. Another end of the extension tube is coupled to a rod end assembly 326, via a torque limiter assembly 328. The rod end assembly 326 is in turn attached to one of the transcowls 102 or 104 (not illustrated in FIG. 3). Thus, rotation of the ball screw shaft 306 in either a deploy direction or a stow direction results in translation of the ball nut 320, extension tube 324 rod end assembly 326, and transcowl 102 or 104, in a deploy direction 330 and a stow direction 332, respectively. In the depicted embodiment second bearing assembly 316 also functions as a mechanical hard stop, which stops translation of the ball nut 320, and thus the attached transcowl 102 or 104, when it moved in a deploy direction 330.

The torque limiter assembly 328, as was noted above, is coupled to the extension tube 324 and the rod end assembly 326. The purpose of the torque limiter assembly 328 is to limit the amount of torque that may be applied to the actuator assembly 210. In particular, in the event a torque is applied to the actuator assembly 210 due, for example, to some type of jam situation, and the applied torque reaches a predetermined magnitude, the torque limiter assembly 328 will function to limit this applied torque by removing the load that caused the torque. The torque limiter assembly 328 may be configured to limit the torque by, for example, completely or partially decoupling the extension tube 324 and rod end assembly 326. No matter the particular configuration, once the torque limiter 328 is tripped, the extension tube is free to rotate, thereby removing the load. The predetermined torque at which the torque limiter assembly 328 trips may vary, depending on particular system and component configurations, but is preferably selected to remove the load from the actuator assembly 210 before it reaches a point where damage occurs.

Figure 4:
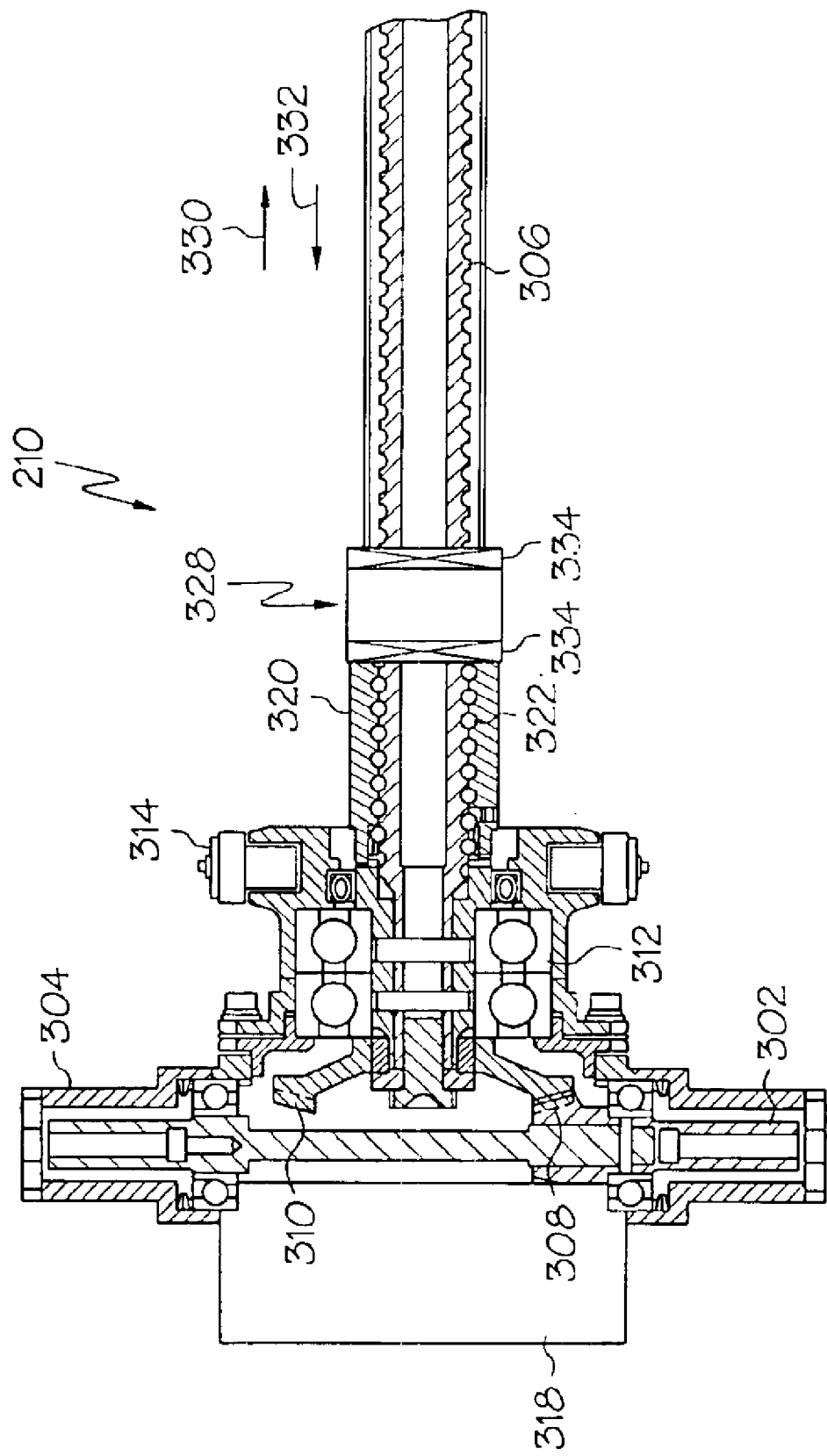

It will be appreciated that the location of the torque limiter assembly 328 is not limited to that depicted in FIG. 3. For example, as shown in FIG. 4, the torque limiter assembly 328 could alternatively be coupled between the ball nut 320 and the extension tube 324. It will additionally be appreciated that the torque limiter assembly 328 may be any one of numerous types of devices not known, or developed in the future, that function as a torque limiter and that the torque limiter assembly 328 may itself be configured to sense the applied torque, or one or more separate torque sensors may be used. Thus, the torque limiter assembly 328 is depicted as a functional block in FIG. 3. Various examples of torque limiter type include, but are not limited to, ball-and-detent type limiters, shear pin type limiters, tooth clutch type limiters, slip clutch type limiters, and wrapped spring type limiters. It will be appreciated. As such, the torque limiter assembly 328 may include one or more axial thrust bearings 334, depending upon the particular type used, to handle to the relative motion between the components that occurs once the torque limiter trips. A more detailed illustration of a particular preferred embodiment of the torque limiter assembly 328 is shown in FIGS. 5 and 6, and will now be described in detail.

Figure 5:
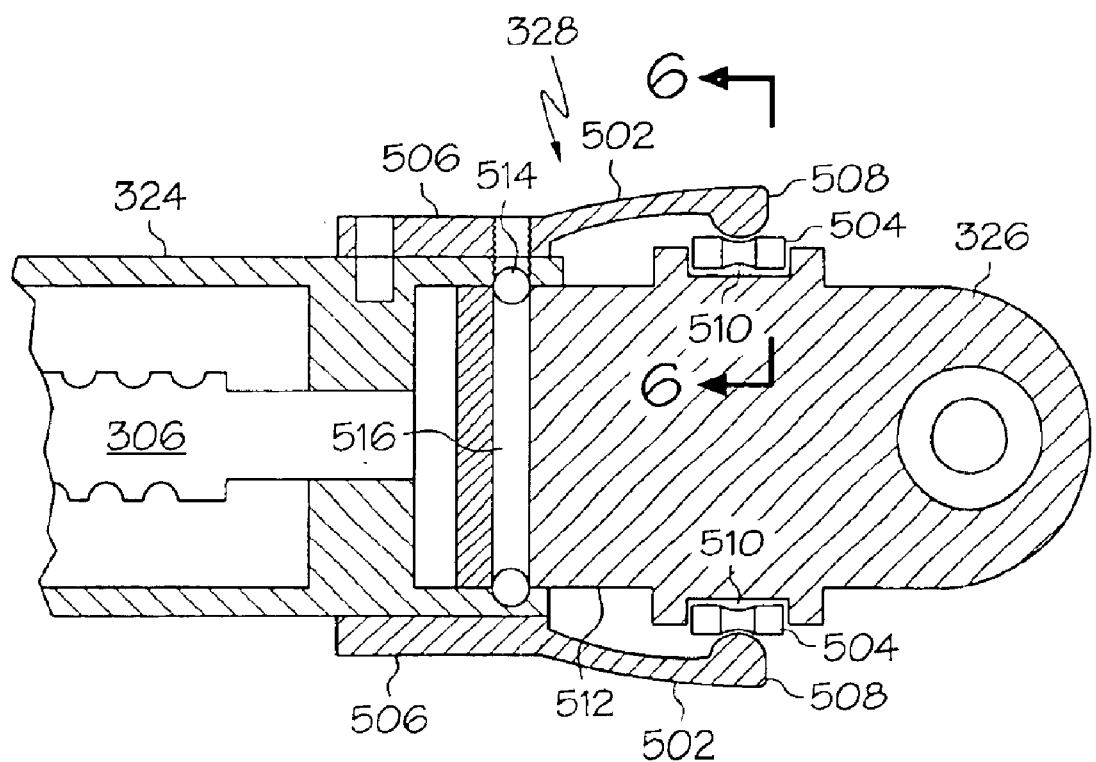
FIG. 5 is a cross section view of an end portion of the actuator assembly shown in FIG. 3 showing a torque limiter assembly according to a particular exemplary embodiment of the present invention.
Figure 6:
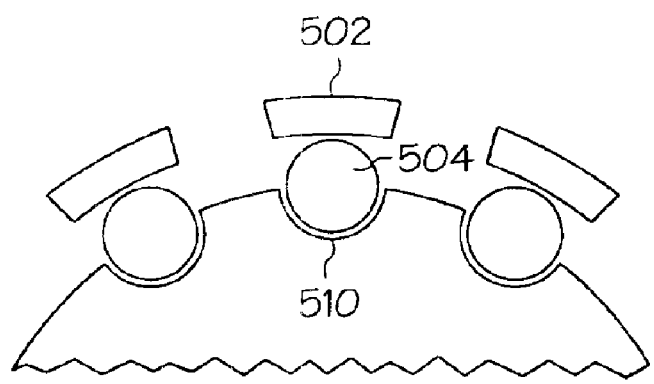
FIG. 6 is an end view of the end portion of the actuator assembly taken along line 6—6 in FIG. 5.

The torque limiter assembly 328 shown in FIGS. 5 and 6 is located between the extension tube 324 and the rod end assembly 326, and includes a plurality of cantilever arms 502, and a plurality of roller pins 504. The cantilever arms 502 each include a fixed end 506 and a free end 508, and are each coupled, via the fixed ends 506, to the extension tube 324. The free ends 508 extend away from the extension tube 324 toward the rod end assembly 326 in cantilever fashion.

The roller pins 504 are each disposed in one of a plurality of pin grooves 510 that are formed in an outer peripheral surface 512 of the rod end assembly 326. The pin grooves 510 are evenly spaced about the rod end assembly outer peripheral surface 512. As shown more clearly in FIG. 6, each of the pin grooves 510 is aligned with a cantilever arm free end 508, which are configured to apply a radial spring load onto each of the roller pins 504 positioned in the aligned pin grooves 510.

If a torque is applied to the actuator assembly 210 that exceeds a first predetermined torque magnitude, the roller pins 504 will roll out of the pin groove 510 in which each is disposed, and into the adjacent pin groove 510. This action will continue at a fairly high rate, and in a ratcheting-type manner, until the applied torque falls below a second predetermined torque magnitude. Thus, once the torque exceeds the first predetermined torque magnitude, and stays above the second predetermined torque magnitude, the extension tube 324 will be partially decoupled from the rod end assembly 326 and will rotate relative to the rod end assembly 326, in substantial synchronism with the ball screw shaft 306.

The first predetermined torque magnitude at which the torque limiter assembly 328 trips, and the second torque magnitude at which torque limiter resets, may each be set by the radial spring load applied by each cantilever free end 508 onto the roller pins 504. The depth of the roller pin grooves 510 may also be used to set the first and second predetermined torque magnitudes, since the groove depths determine the force vector angles associated with the torque transmitting capability of the roller pin 504 under any given radial spring load.

As was noted above, when the first predetermined torque magnitude is reached, the extension tube 324 and rod end assembly 326 will rotate relative to one another. To reduce frictional forces between the extension tube 324 and rod end assembly 362 during this relative rotation, a plurality of ball bearings 514 are disposed in a bearing groove 516 that is formed in, and circumscribes, the rod end assembly outer peripheral surface 512. This configuration allows reduced-friction relative rotation between the extension tube 324 and rod end assembly 326 when the torque limiter assembly 328 trips, while simultaneously transmitting axial loads. It will be appreciated that the bearing groove 516 could also be formed in the extension tube 324, or in both the extension tube and rod end assembly 326.

The actuator assembly described above includes an integral torque limiter assembly that limits the torque that may be applied to the actuator assembly. As a result, the cost and/or the weight of the thrust reverser system and/or the system components can be reduced relative to other designs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A thrust reverser control system, comprising:

a power drive unit operable to supply a drive force;

at least two drive mechanisms each coupled to receive the drive force from the power drive unit; and at least two actuator assemblies, each actuator assembly coupled to at least one of the drive mechanisms and including:

an actuator coupled to receive the drive force from one of the drive mechanisms, the actuator having at least one end that rotates in response to the drive force and configured to move, upon receipt of the drive force, between a stowed position and a deployed position, a torque limiter assembly mounted to the end of the actuator and configured to limit torque in the actuator assembly upon a torque magnitude being reached in at least the actuator while allowing continued rotation of the at least one end of the actuator, at least two roller pins, each roller pin having an outer surface and moveably mounted in one of the rod end assembly grooves, and at least two substantially resilient cantilever arms each having a fixed end and a free end, each cantilever arm fixed end fixedly coupled to the extension tube and each cantilever arm free end in contact with the outer surface of one of the roller pins, to thereby apply a radial load thereon.

2. The system of claim 1, wherein the actuator comprises:

a rotationally mounted actuator shaft configured to rotate, upon receipt of the drive force, in a stow direction and a deploy direction; and an extension tube mounted on the actuator shaft and coupled to the torque limiter assembly, the extension tube configured to translate between the stowed position and the deployed position in response to actuator shaft rotation in the stow direction and the deploy direction, respectively.

3. The system of claim 2, further comprising:

a rod end assembly selectively moveably coupled to the torque limiter assembly, the rod assembly configured to selectively rotate relative to the extension tube, and adapted to couple to a thrust reverser moveable component.

4. The system of claim 3, wherein the torque limiter assembly at least partially decouples the extension tube from the rod end assembly upon the torque magnitude being reached in the extension tube, to thereby limit torque applied to the actuator assembly.

5. The system of claim 2, wherein the extension tube is further configured to rotate in substantial synchronism with the actuator shaft when the torque limiter assembly limits the applied torque.

6. The system of claim 2, wherein:

the actuator shaft comprises a ball screw; and the extension tube comprises a ball nut mounted on the ball screw, the ball nut configured to translate between the stowed position and the deployed position in response to ball screw rotation in the stow direction and the deploy direction, respectively.

7. The system of claim 3, wherein the torque limiter assembly comprises:

at least two roller pins, each roller pin having an outer surface and moveably mounted in a groove formed in the rod end assembly; and at least two substantially resilient cantilever arms each having a fixed end and a free end, each cantilever arm fixed end fixedly coupled to the actuator and each cantilever arm free end in contact with the outer surface of one of the roller pins, to thereby apply a radial load thereon.

8. The system of claim 7, wherein:

the grooves formed in the rod assembly each have a substantially equivalent groove depth; and the torque magnitude at which the torque limiter assembly limits torque applied to the actuator assembly is based, at least in part, on groove depth.

9. The system of claim 7, wherein the torque magnitude at which the torque limiter assembly limits torque applied to the actuator assembly is based, at least in part, on the radial load applied by each cantilever arm on each roller pin.

10. The system of claim 7, wherein each of the roller pins rolls out of one groove and into an adjacent groove when the torque magnitude is reached, to thereby at least partially decouple the actuator from the rod end assembly.

11. The actuator assembly of claim 3, further comprising:

a thrust bearing assembly coupled between the actuator and the torque limiter assembly.

12. The actuator of claim 11, wherein the thrust bearing assembly comprises:

a bearing groove formed in at least one of the actuator and the rod end assembly; and a plurality of ball bearings disposed within the bearing groove and in moveable contact with the actuator and the rod end assembly, wherein the bearing groove and ball bearings are configured to transmit an axial force between the actuator and the rod end assembly and, when the torque magnitude is reached, whereby relative rotation between the actuator and the rod end assembly is allowed.

13. A thrust reverser actuator assembly, comprising:

an actuator adapted to receive a drive force, the actuator having at least one end that rotates in response to the drive force and configured, in response to receipt of the drive force, to move between a stowed position and a deployed position, the actuator including a rotationally mounted actuator shaft configured to rotate, upon receipt of the drive force, in a stow direction and a deploy direction, an extension tube mounted on the actuator shaft and configured to translate between the stowed postion and the deployed position in response to actuator shaft rotation in the stow direction and the deploy direction, respectively, and a rod end assembly having at least two grooves formed in an outer surface thereof; and a torque limiter assembly mounted to the end of the actuator and configured to limit torque applied to the actuator assembly upon a torque magnitude being reached in at least the actuator while allowing continued rotation of the at least one end of the actuator, the torque limiter assembly including:

at least two roller pins, each roller pin having an outer surface and moveably mounted in one of the rod end assembly grooves, and at least two substantially resilient cantilever arms each having a fixed end and a free end, each cantilever arm fixed end fixedly coupled to the extension tube and each cantilever arm free end in contact with the outer surface of one of the roller pins, to thereby apply a radial load thereon.

14. The actuator assembly of claim 13, wherein the actuator comprises:

a rotationally mounted actuator shaft configured to rotate, upon receipt of the drive force, in a stow direction and a deploy direction; and an extension tube mounted on the actuator shaft and coupled to the torque limiter assembly, the extension tube configured to translate between the stowed position and the deployed position in response to actuator shaft rotation in the stow direction and the deploy direction, respectively.

15. The actuator assembly of claim 14, further comprising:

a rod end assembly coupled to the torque limiter assembly, the rod end assembly configured to selectively rotate relative to the extension tube and the torque limiter assembly, and adapted to couple to a thrust reverser moveable component.

16. The actuator assembly of claim 15, wherein the torque limiter assembly at least partially decouples the extension tube from the rod end assembly upon the torque magnitude being reached in the extension tube, to thereby limit torque applied to the actuator assembly.

17. The actuator assembly of claim 14, wherein the extension tube is further configured to rotate in substantial synchronism with the actuator shaft when the torque limiter assembly limits the applied torque.

18. The actuator assembly of claim 14, wherein:
the actuator shaft comprises a ball screw; and
the extension tube comprises a ball nut mounted on the ball screw, the ball nut configured to translate between the stowed position and the deployed position in response to ball screw rotation in the stow direction and the deploy direction, respectively.

19. The actuator assembly of claim 15, wherein the torque limiter assembly comprises:

at least two roller pins, each roller pin having an outer surface and moveably mounted in a groove formed in the rod end assembly; and at least two substantially resilient cantilever arms each having a fixed end and a free end, each cantilever arm fixed end fixedly coupled to the actuator and each cantilever arm free end in contact with the outer surface of one of the roller pins, to thereby apply a radial load thereon.

20. The actuator assembly of claim 19, wherein:
the grooves formed in the rod end assembly each have a substantially equivalent groove depth; and
the torque magnitude at which the torque limiter assembly limits torque applied to the actuator assembly is based, at least in part, on groove depth.

21. The actuator assembly of claim 19, wherein the torque magnitude at which the torque limiter assembly limits torque applied to the actuator assembly is based, at least in part, on the radial load applied by each cantilever arm on each roller pin.

22. The actuator assembly of claim 19, wherein each of the roller pins rolls out of one groove and into an adjacent groove when the torque magnitude is reached, to thereby at least partially decouple the actuator from the rod end assembly.

23. The actuator assembly of claim 15, further comprising:
a thrust bearing assembly coupled between the actuator and the torque limiter assembly.

24. The actuator assembly of claim 14, wherein the thrust bearing assembly comprises:

a bearing groove formed in at least one of the actuator and the rod end assembly; and a plurality of ball bearings disposed within the bearing groove and in moveable contact with the actuator and the rod end assembly, wherein the bearing groove and ball bearings are configured to transmit an axial force between the actuator and the rod end assembly and, when the torque magnitude is reached, whereby relative rotation between the actuator and the rod end assembly is allowed.

* * * * *

UNITED STATES PATENT AND TRADEMARK OFFICE
CERTIFICATE OF CORRECTION

PATENT NO. : 6,974,107 B2 Page 1 of 1
APPLICATION NO. : 10/465413
DATED : December 13, 2005
INVENTOR(S) : Donald J. Christensen et al.

It is certified that error appears in the above-identified patent and that said Letters Patent is hereby corrected as shown below:

In Column 7, Line 38, "actuator," should be changed to --actuator, the torque limiter assembly including:--;

In Column 7, Line 41, "one of the" should be changed to --a--;

In Column 7, Line 42, "grooves" should be changed to --groove--;

In Column 7, Line 45, "to the" should be changed to --to an--;

In Column 7, Line 67, "assembly at least partially decouples" should be changed to --assembly decouples--.

In Column 8, Lines 39-40, "reached, to thereby at least partially decouple the actuator from the rod end assembly" should be changed to --reached.--;

In Column 8, Line 62, "including" should be changed to --including:--.

In Column 9, Line 41, "assembly at least partially decouples" should be changed to --assembly decouples--.

In Column 10, Lines 30-32, "reached, to thereby at least partially decouple the actuator from the rod end assembly." should be changed to --reached.--.

Signed and Sealed this

Fourteenth Day of August, 2007

JON W. DUDAS
*Director of the United States Patent and Trademark Office*